(12) United States Patent
Fujita et al.

(10) Patent No.: US 8,206,613 B2
(45) Date of Patent: *Jun. 26, 2012

(54) PHOSPHOR COMPOSITE MATERIAL AND PHOSPHOR COMPOSITE MEMBER

(75) Inventors: Shunsuke Fujita, Otsu (JP); Yoshio Umayahara, Otsu (JP); Masaru Iwao, Otsu (JP); Takemi Kikutani, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 632 days.

This patent is subject to a terminal disclaimer.

(21) Appl. No.: 12/308,371

(22) PCT Filed: May 15, 2007

(86) PCT No.: PCT/JP2007/059929
§ 371 (c)(1),
(2), (4) Date: Dec. 12, 2008

(87) PCT Pub. No.: WO2007/145047
PCT Pub. Date: Dec. 21, 2007

(65) Prior Publication Data
US 2010/0155666 A1    Jun. 24, 2010

(51) Int. Cl.
*C09K 11/08* (2006.01)
*C09K 11/00* (2006.01)
*C03C 8/14* (2006.01)

(52) U.S. Cl. .... 252/301.4 R; 252/301.4 P; 252/301.4 F; 501/32

(58) Field of Classification Search ........... 252/301.4 R, 252/301.4 P, 301.4 F; 501/32
See application file for complete search history.

(56) References Cited

U.S. PATENT DOCUMENTS

| | | | |
|---|---|---|---|
| 4,331,553 A | 5/1982 | Fan et al. | 252/301.36 |
| 6,306,783 B1 | 10/2001 | Yamanaka | 501/15 |
| 6,309,989 B1 * | 10/2001 | Kikutani | 501/15 |
| 6,355,586 B1 | 3/2002 | Usui et al. | 501/45 |
| 2006/0113885 A1 * | 6/2006 | Iimura | 313/485 |

FOREIGN PATENT DOCUMENTS

| | | |
|---|---|---|
| JP | 10-101371 | 4/1998 |
| JP | 11-292564 | 10/1999 |
| JP | 2000-169183 | 6/2000 |
| JP | 2001-294443 | 10/2001 |
| JP | 2002-161272 | 6/2002 |
| JP | 2003-258308 | 9/2003 |
| JP | 2005-011933 | 1/2005 |
| JP | 2005-112715 | 4/2005 |
| JP | 2006-092959 | 4/2006 |

* cited by examiner

*Primary Examiner* — Carol M Koslow
(74) *Attorney, Agent, or Firm* — Kubovcik & Kubovcik

(57) ABSTRACT

Disclosed is a phosphor composite material which can be fired at low temperatures and enables to obtain a phosphor composite member which is excellent in weather resistance and reduced in deterioration after long use. Also disclosed is a phosphor composite member obtained by firing such a phosphor composite material. Specifically disclosed is a phosphor composite material composed of a glass powder and a phosphor powder, which is characterized in that the glass powder is composed of $SnO$—$P_2O_5$—$B_2O_3$ glass.

7 Claims, No Drawings

PHOSPHOR COMPOSITE MATERIAL AND PHOSPHOR COMPOSITE MEMBER

This application is a 371 of international application PCT/JP2007/059929, filed May 15, 2007, which claims priority based on Japanese patent application Nos. 2006-164232 and 2007-112773 filed Jun. 14, 2006, and Apr. 23, 2007, respectively, which are incorporated herein by reference.

TECHNICAL FIELD

The present invention relates to a phosphor composite material and a phosphor composite member used in a device such as an LED or an LD.

BACKGROUND ART

In recent years, white LEDs have been expected to be applied to illumination as the next-generation light sources instead of incandescent lamps or fluorescent lamps.

In an LED element for attaining wavelength-conversion by use of a phosphor, the light-emitting surface of its LED chip is molded with an organic binder resin containing a phosphor powder. When light rays emitted from the LED chip pass through this molded region, the light rays are wholly absorbed into the phosphor so that the wavelengths thereof are converted to different wavelengths, or the light rays are partially absorbed into the phosphor so that the converted light rays are combined with the transmitted light rays. In this way, desired light rays are emitted.

However, there remains a problem that the mold resin, which constitutes the LED element, is deteriorated by high-power light rays, which have short wavelengths in the range from blue wavelengths to ultraviolet ray wavelengths, so that the resin is discolored.

In order to solve the problem, in Patent Document 1, proposed is a phosphor composite member about which a material containing a lead-free glass powder having a softening point of 500° C. or higher and a phosphor powder is fired at a temperature not lower than the softening point of the glass to disperse the phosphor powder in the glass.

With the phosphor composite member disclosed in Patent Document 1, the phosphor powder is dispersed in the glass, which is an inorganic material; thus, it is possible to obtain a product which is chemically stable so as to be less deteriorated, and which is less discolored by light rays emitted therefrom.

Patent Document 1: Japanese Patent Application Laid-Open (JP-A) No. 2003-258308
Patent Document 2: JP-A No. 2005-11933

DISCLOSURE OF THE INVENTION

However, some commercially available phosphors are low in heat resistance. There is caused a problem that when such a phosphor is sintered together with a lead-free glass powder having a softening point of 500° C. or higher, the phosphor is deteriorated by heat in the sintering, so as to give a low light-emitting efficiency.

In order to solve the problem, it is considered that the phosphor is dispersed in a low melting point glass as disclosed in Patent Document 2. In general, however, as glass has a lower melting point, the glass reacts with the phosphor upon sintering, and the sintered product is discolored so that the transmittance of the sintered product becomes lower, and thus there is caused a problem that the light-emitting efficiency is largely lowered. Moreover, the weather resistance of the glass is low so that the surface thereof degenerates in use in an environment being large in humidity. As a result, there arises a problem that the transmittance of the sintered product falls so that the light-emitting efficiency is largely lowered.

An object of the present invention is to provide a phosphor composite material which can be fired at low temperature and does not react easily with a phosphor, and which further enables to obtain a phosphor composite member that is excellent in weather resistance and reduced in deterioration after long use; and a phosphor composite member obtained by firing the same.

The phosphor composite material of the present invention is a phosphor composite material comprising a glass powder and a phosphor powder, wherein the glass powder is composed of $SnO$—$P_2O_5$—$B_2O_3$ glass.

Moreover, the phosphor composite member of the present invention is a member obtained by firing the phosphor composite material.

EFFECT OF THE INVENTION

The phosphor composite material of the present invention comprises a glass powder which has a low softening point, does not react easily with a phosphor, and is excellent in weather resistance as well as a phosphor powder. Therefore, the phosphor composite member obtained by firing the phosphor composite material of the present invention can be a phosphor composite member which can be fired at low temperature, does not react easily with the phosphor, and is excellent in weather resistance and reduced in deterioration after long use.

BEST MODE FOR CARRYING OUT THE INVENTION

The glass powder in the phosphor composite material of the present invention has a basic composition wherein $B_2O_3$ is incorporated into $SnO$—$P_2O_5$ glass which is a low melting point glass. In general, $SnO$—$P_2O_5$ glass which is a low melting point glass is low in weather resistance, and reacts with a phosphor when it is mixed with the phosphor and fired to result in the light-emitting efficiency being lowered. However, in the glass in the present invention, $B_2O_3$ is contained which is a component for preventing reaction with the phosphor and improving weather resistance. For this reason, even the phosphor composite material comprising the low melting point glass powder can give a phosphor composite member wherein reaction with the phosphor is less caused and an excellent weather resistance is exhibited.

It is preferred to contain $B_2O_3$ in an amount of 1% or more by mole in order to prevent reaction with the phosphor and improve the weather resistance. However, if the content of $B_2O_3$ is large, the softening point of the glass tends to rise so that the phosphor composite material is not easily fired at low temperature. Conversely, the content is preferably set to 30% or less by mole, otherwise the glass thus reacts with the phosphor and the weather resistance falls easily. The range of the $B_2O_3$ content is preferably from 2 to 20%, more preferably from 4 to 20%, most preferably from 4 to 18%.

With the glass powder in the invention, the value by mole of $SnO/P_2O_5$ is preferably set into the range of 0.9 to 16. If the value of $SnO/P_2O_5$ is smaller than 0.9, the softening point of the glass tends to rise so that the phosphor composite material is not easily fired at low temperature and the phosphor is easily deteriorated. Additionally, the weather resistance tends to fall remarkably. On the other hand, if the value of $SnO/P_2O_5$ is larger than 16, devitrification grains derived from Sn precipitate in the glass so that the transmittance of the glass tends to fall. As a result, a phosphor composite member having a high light-emitting efficiency is not easily obtained. The range of the value of $SnO/P_2O_5$ is preferably from 1.5 to 16, more preferably from 1.5 to 10, most preferably from 2 to 5.

The glass powder in the present invention is preferably made of a glass having an internal transmittance of 80% or more at a thickness of 1 mm and a wavelength of 588 nm. When the internal transmittance of the glass is set to 80% or more, the transmittance of excited light and that of converted light generated by the excited light become so high that the light-emitting efficiency of the phosphor composite member can be improved. If the internal transmittance of the glass is lower than 80%, a phosphor composite member having a high light-emitting efficiency is not easily obtained. The range of the internal transmittance of the glass is more preferably 92% or more, more preferably 93% or more.

A glass having a high internal transmittance can be obtained by using and melting glass ingredients in which an amount of colored impurities such as iron, chromium, cobalt, copper and nickel is small in order to restrain a fall in the transmittance due to light absorption, and melting the glass under a reduction atmosphere (non-oxidizing atmosphere such as $N_2$ gas or Ar gas) or adding a small amount of a reducing agent such as metallic aluminum to glass ingredients and melting the glass ingredients in order to restrain a fall in the internal transmittance due to the precipitation of devitrification grains derived from Sn.

Furthermore, it is preferred that the glass powder in the present invention has a softening point of 400° C. or lower. If the softening point is set to 400° C. or lower, a phosphor composite member where the phosphor is less deteriorated can be obtained even when a phosphor low in heat resistance is used. If the softening point is higher than 400° C., the phosphor tends to be deteriorated and the light-emitting efficiency of the phosphor composite member lowers easily when the phosphor low in heat resistance is used. The range of the softening point is more preferably 380° C. or lower.

The $SnO—P_2O_5—B_2O_3$ glass powder of the present invention is not particularly limited as far as the glass is a glass which has a high internal transmittance and a low softening point, does not react easily with the phosphor, and is excellent in weather resistance. It is particularly preferred to use a glass, in a mole percentage, having the following composition: 35 to 80% of SnO, 5 to 40% of $P_2O_5$, 1 to 30% of $B_2O_3$, 0 to 10% of $Al_2O_3$, 0 to 10% of $SiO_2$, 0 to 10% of $Li_2O$, 0 to 10% of $Na_2O$, 0 to 10% of $K_2O$, 0 to 10% of $Li_2O+Na_2O+K_2O$, 0 to 10% of MgO, 0 to 10% of CaO, 0 to 10% of SrO, 0 to 10% of BaO and 0 to 10% of MgO+CaO+SrO+BaO, and satisfying the following: the ratio by mole of $SnO/P_2O_5$ is from 0.9 to 16.

The reason why the glass composition is limited as described above in the present invention is as follows.

SnO is a component for forming the skeleton of the glass and further lowering the softening point. The content thereof is from 35 to 80%. If the content of SnO is low, the softening point of the glass tends to rise, the phosphor composite material is not easily fired at low temperature, and the phosphor is easily deteriorated. On the other hand, if the content is high, devitrification grains derived from Sn precipitate in the glass so that the transmittance of the glass tends to fall. As a result, a phosphor composite member having a high light-emitting efficiency is not easily obtained. Additionally, the material does not easily vitrify. The range of the content of SnO is more preferably from 40 to 70%, even more preferably from 50 to 70%, most preferably from 55 to 65%.

$P_2O_5$ is a component for forming the skeleton of the glass. The content thereof is from 5 to 40%. If the content of $P_2O_5$ is low, the material does not easily vitrify. On the other hand, if the content is high, the softening point of the glass tends to rise, the phosphor composite material is not easily fired at low temperature, and the phosphor is easily deteriorated. Additionally, the weather resistance tends to fall remarkably. The range of the content of $P_2O_5$ is more preferably from 10 to 30%, even more preferably from 15 to 24%.

In order to lower the softening point and further stabilize the glass, the value of $SnO/P_2O_5$ is preferably set in the range of 0.9 to 16 in a mole ratio. If the value of $SnO/P_2O_5$ is lower than 0.9, the softening point of the glass tends to rise, the phosphor composite material is not easily fired at low temperature, and the phosphor is easily deteriorated. Additionally, the weather resistance tends to fall remarkably. On the other hand, if the value of $SnO/P_2O_5$ is higher than 16, devitrification grains derived from Sn precipitate in the glass so that the transmittance of the glass tends to fall. As a result, a phosphor composite member having a high light-emitting efficiency is not easily obtained. The range of the value of $SnO/P_2O_5$ is more preferably from 1.5 to 16, even more preferably from 1.5 to 10, most preferably from 2 to 5.

$B_2O_3$ is a component for preventing reaction with the phosphor and improving the weather resistance. $B_2O_3$ is also a component for stabilizing the glass. The content thereof is from 1 to 30%. If the content of $B_2O_3$ is low, the above-mentioned advantageous effects are not easily obtained. On the other hand, if the content is high, the glass conversely comes to react easily with the phosphor or be poor in weather resistance. In addition, the softening point of the glass tends to rise, the phosphor composite material is not easily fired at low temperature, and the phosphor is easily deteriorated. The content of $B_2O_3$ is more preferably from 2 to 20%, even more preferably from 4 to 18%.

$Al_2O_3$ is a component for stabilizing the glass. The content thereof is from 0 to 10%. If the content of $Al_2O_3$ is high, the softening point of the glass tends to rise, the phosphor composite material is not easily fired at low temperature, and the phosphor is easily deteriorated. The content of $Al_2O_3$ is more preferably from 0 to 7%, even more preferably from 1 to 5%.

$SiO_2$ is a component for stabilizing the glass similar to $Al_2O_3$. The content thereof is from 0 to 10%. If the content of $SiO_2$ is high, the softening point of the glass tends to rise, the phosphor composite material is not easily fired at low temperature, and the phosphor is easily deteriorated. Additionally, the glass easily undergoes phase separation. The content of $SiO_2$ is more preferably from 0 to 7%, even more preferably from 0 to 5%.

$Li_2O$ is a component for making the softening point of the glass remarkably low, and improving the light-emitting efficiency of the phosphor when the phosphor composite member is formed. The content thereof is from 0 to 10%. If the content of $Li_2O$ is high, the glass easily becomes remarkably unstable, and the material does not easily vitrify. The content of $Li_2O$ is more preferably from 0 to 7%, even more preferably from 1 to 5%.

$Na_2O$ is a component for lowering the softening point of the glass, and improving the light-emitting efficiency of the phosphor somewhat when the phosphor composite member is formed. The content thereof is from 0 to 10%. If the content of $Na_2O$ is high, the glass easily becomes unstable and the glass ingredients do not easily vitrify. The content of $Na_2O$ is more preferably from 0 to 7%, even more preferably from 0 to 5%.

$K_2O$ is a component for lowering the softening point of the glass somewhat, and improving the light-emitting efficiency of the phosphor when the phosphor composite member is formed. The content thereof is from 0 to 10%. If the content of $K_2O$ is high, the glass easily becomes unstable and the glass ingredients do not easily vitrify. The content of $K_2O$ is more preferably from 0 to 7%, even more preferably from 1 to 5%.

The total content of $Li_2O$, $Na_2O$ and $K_2O$ is preferably set in the range of 0 to 10%. If the content of these components becomes more than 10%, the glass easily becomes unstable and the glass ingredients do not easily vitrify. The range of the content of $Li_2O+Na_2O+K_2O$ is more preferably from 0 to 7%, even more preferably from 1 to 5%.

MgO is a component for stabilizing the glass and vitrifying the glass ingredients with ease, and improving the light-emitting efficiency of the phosphor remarkably when the phosphor composite member is formed. The content thereof is from 0 to 10%. If the content of MgO is high, the glass devitrifies so easily that the transmittance of the glass tends to fall. As a result, a phosphor composite member having a high light-emitting efficiency is not easily obtained. The content of MgO is more preferably from 0 to 7%, even more preferably from 1 to 5%.

CaO is a component for stabilizing the glass and vitrifying the glass ingredients with ease. The content thereof is from 0 to 10%. If the content of CaO is high, the glass devitrifies so easily that the transmittance of the glass tends to fall. As a result, a phosphor composite member having a high light-emitting efficiency is not easily obtained. The content of CaO is more preferably from 0 to 7%, even more preferably from 0 to 5%.

SrO is a component for stabilizing the glass and vitrifying the glass ingredients with ease. The content thereof is from 0 to 10%. If the content of SrO is high, the glass devitrifies so easily that the transmittance of the glass tends to fall. As a result, a phosphor composite member having a high light-emitting efficiency is not easily obtained. The content of SrO is more preferably from 0 to 7%, even more preferably from 0 to 5%.

BaO is a component for stabilizing the glass and vitrifying the glass ingredients with ease. The content thereof is from 0 to 5%. If the content of BaO is high, the glass remarkably devitrifies so easily that the transmittance of the glass tends to fall. As a result, a phosphor composite member having a high light-emitting efficiency is not easily obtained. The content of BaO is more preferably from 0 to 3%, even more preferably from 0 to 1%.

The total content of MgO, CaO, SrO and BaO is preferably set in the range of 0 to 10%. If the content of these components is more than 10%, the glass devitrifies so easily that the transmittance of the glass tends to fall. As a result, a phosphor composite member having a high light-emitting efficiency is not easily obtained. The range of the content of MgO+CaO+SrO+BaO is more preferably from 0 to 7%, even more preferably from 1 to 5%.

Various components other than the above-mentioned components may be added as far as the subject matter of the present invention is not damaged. For example, in order to improve the weather resistance, ZnO, $Ta_2O_5$, $TiO_2$, $Nb_2O_5$, $Gd_2O_3$, and/or $La_2O_3$ may be added in a total amount of 10% or less.

However, since color components such as $Fe_2O_3$, $Cr_2O_3$, CoO, CuO and NiO cause the glass to be colored so as to lower the internal transmittance of the glass, it is preferred to control the total content of these components to 0.02% or less.

The glass powder in the phosphor composite material of the present invention can be obtained by selecting glass ingredients where the amount of colored impurities is small such that the content of color components in the glass is set to 0.02% or less, blending the glass ingredients with each other to give a glass composition in the above-mentioned glass composition range, putting the blended glass ingredients into a crucible, melting the ingredients under a reduction atmosphere to yield a glass ingot, pulverizing the ingot, and classifying the resultant particles.

The phosphor powder in the phosphor composite material of the present invention is not particularly limited as far as the powder has a luminescence peak in a visible range. The visible range in the present invention refers to a range of 380 to 780 nm. Examples of such a phosphor include oxides, nitrides, oxynitrides, chlorides, oxychlorides, sulfides, oxysulfides, halides, chalcogenides, aluminates, halophosphoric acid chloride, and YAG compounds. Phosphors such as nitrides, oxynitrides, chlorides, oxychlorides, sulfides, oxysulfides, halides, chalcogenides, aluminates, and halophosphoric acid chloride are each caused to react with the glass by heating upon firing, abnormal reaction such as foaming and discoloration is easily caused, and the degree thereof becomes more remarkable as the firing temperature is higher. Even if such a phosphor is used, the phosphor composite material can be fired at a low temperature of 400° C. or lower in the present invention since the softening point of the glass is low; thus, the phosphor can be used.

The light-emitting efficiency of the phosphor composite member is varied depending on the kind and the content of the phosphor particles dispersed in the glass, the thickness of the phosphor composite member, and others. The content of the phosphor and the thickness of the phosphor composite member may be adjusted to achieve an optimal light-emitting efficiency. If the amount of the phosphor is too large, the composite material is not easily sintered or the porosity is made large so as to result in problems that, for example, exited light is not easily radiated effectively to the phosphor and that the mechanical strength of the phosphor composite member decreases easily. On the other hand, if the amount is too small, it is difficult to cause the member to emit light sufficiently. Therefore, the blend ratio of the glass powder to the phosphor powder (glass powder:the phosphor powder) in the phosphor composite material is preferably from 99.99:0.01 to 70:30, more preferably form 99.95:0.05 to 80:20, particularly preferably from 99.92:0.08 to 85:15.

The phosphor composite member of the present invention can be obtained by firing the phosphor composite material of the present invention.

The firing atmosphere may be air. When a denser sintered body is obtained or when reaction between the glass and the phosphor is decreased, the material is preferably fired in a reduced pressure or vacuum atmosphere or in an inert gas atmosphere such as nitrogen or argon.

The firing temperature is preferably from 300 to 400° C. If the firing temperature is higher than 400° C., the phosphor is deteriorated or the glass reacts with the phosphor so that the light-emitting efficiency may remarkably fall. If the firing temperature is lower than 300° C., the porosity of the sintered body increases so that the light transmittance may fall.

The form of the phosphor composite material of the present invention when the phosphor composite material is fired to yield a phosphor composite member is not particularly limited, and may be, for example, a molded body obtained by press-molding the powder of the phosphor composite material into a desired shape, a paste form, or a green-sheet form.

When the powder of the phosphor composite material of the present invention is press-molded to prepare a phosphor composite member, the phosphor composite member can be obtained by adding, to the phosphor composite material comprising glass powders and phosphor powders, a resin binder in an amount of 0 to 5% by mass, press-molding the mixture in a mold to produce a preliminary molded body, subjecting the preliminary molded body to binder-removing treatment at a temperature of 250° C. or lower, and then firing the resultant at about 300 to 400° C.

The used resin binder is desirably a resin binder where the decomposition-ended temperature of the resin is 250° C. or lower. Examples thereof include nitrocellulose, polyisobutyl acrylate, and polyethyl carbonate. These may be used alone or in a mixture form.

When the phosphor composite material of the present invention is used in a paste form, it is preferred to use a binder, a solvent and the like with the phosphor composite material comprising glass powders and phosphor powders, and make the components into a paste. The ratio of the phosphor composite material in the whole of the paste is generally from 30 to 90% by mass.

The binder is a component for heightening the film strength after drying, or giving softness thereto. The content thereof is generally from about 0.1 to 20% by mass. Examples of the binder include polybutyl methacrylate, polyvinyl butyral, polymethyl methacrylate, polyethyl methacrylate, ethylcellulose, and nitrocellulose. These may be used alone or in a mixture form.

The solvent is used for making the material into a paste form. The content thereof is generally from about 10 to 50% by mass. Examples of the solvent include terpineol, isoamyl acetate, toluene, methyl ethyl ketone, diethylene glycol monobutyl ether acetate, and 2,2,4-trimethyl-1,3 pentadiol monoisobutyrate. These may be used alone or in a mixture form.

The paste can be produced by preparing the phosphor composite material, the binder, the solvent and on the like, and kneading these components at a predetermined ratio.

In order to form a phosphor composite member by use of such a paste, a substrate made of an inorganic material having a thermal expansion coefficient similar to that of the phosphor composite member is prepared, and the paste is applied onto the substrate by screen printing, batch coating or the like to form the applied layer having a predetermined film thickness. Thereafter, the resultant is dried and fired at about 300 to 400° C., and then the inorganic material substrate is taken off. In this way, a predetermined phosphor composite member can be formed.

When the phosphor composite material of the present invention is used in a green-sheet form, a binder, a plasticizer, a solvent and on the like are used with the phosphor composite material comprising glass powders and phosphor powders, and the components are made into a green sheet.

The ratio of the phosphor composite material in the green sheet is generally from about 50 to about 80% by mass.

The binder and the solvent that can be used may be the same as used in the preparation of the above-mentioned paste. The blend percentage of the binder is generally from about 0.1 to about 30% by mass, and the blend percentage of the solvent is generally from about 1 to about 40% by mass.

The plasticizer is a component for controlling the dry speed and giving softness to the dried film. The content thereof is generally from about 0 to about 10% by mass. Examples of the plasticizer include dibutyl phthalate, butylbenzyl phthalate, dioctyl phthalate, diisooctyl phthalate, dicapryl phthalate, and dibutyl phthalate. These may be used alone or in a mixture form.

In an ordinary method for forming the green sheet, the above-mentioned phosphor composite material, binder and plasticizer, and the like are prepared, and then the solvent is added thereto so as to prepare a slurry. The slurry is made into a sheet form on a film made of polyethylene terephthalate (PET) or the like by a doctor blade method. After the formation into the sheet, the sheet is dried to remove the organic solvent and the like and to produce the green sheet.

In order to form a phosphor composite member using the thus obtained green sheet, a substrate made of an inorganic material having a thermal expansion coefficient similar to that of the phosphor composite member is prepared, the green sheet is laminated on the substrate, and then the resultant is thermally compressed to form an applied layer. Thereafter, the resultant is fired as in the case of the paste, and then the inorganic material substrate is taken off to obtain a phosphor composite member.

When the thus obtained phosphor composite member is arranged on a light-emitting side surface of a light-emitting chip of an LED, light rays emitted from the light-emitting chip can be converted to light rays having different wavelengths.

The phosphor composite member of the present invention is, for example, a member for converting light rays having wavelengths of 300 to 500 nm to visible rays. The conversion property thereof can be variously adjusted depending on the kind of the phosphor to be used.

EXAMPLES

The present invention will be described by way of the following examples.

Tables 1 to 4 show Examples (samples Nos. 1 to 24) of the invention, and Comparative Examples (Samples Nos. 25 and 26).

TABLE 1

| Glass Composition (% by mole) | 1 | 2 | 3 | 4 | 5 | 6 | 7 |
|---|---|---|---|---|---|---|---|
| SnO | 62.0 | 62.0 | 62.0 | 62.0 | 62.0 | 62.0 | 62.0 |
| $P_2O_5$ | 21.0 | 21.0 | 21.0 | 21.0 | 21.0 | 21.0 | 21.0 |
| $B_2O_3$ | 11.5 | 11.5 | 11.5 | 11.5 | 11.5 | 11.5 | 11.5 |
| $Al_2O_3$ | 2.5 | 2.5 | 2.5 | 2.5 | 2.5 | 2.5 | 2.5 |
| $SiO_2$ | 3.0 | — | — | — | — | — | — |
| $Li_2O$ | — | 3.0 | — | — | — | — | — |
| $Na_2O$ | — | — | 3.0 | — | — | — | — |
| $K_2O$ | — | — | — | 3.0 | — | — | — |
| MgO | — | — | — | — | 3.0 | — | — |
| CaO | — | — | — | — | — | 3.0 | — |
| SrO | — | — | — | — | — | — | 3.0 |
| BaO | — | — | — | — | — | — | — |
| ZnO | — | — | — | — | — | — | — |
| NiO | — | — | — | — | — | — | — |
| $SnO/P_2O_5$ | 2.9 | 2.9 | 2.9 | 2.9 | 2.9 | 2.9 | 2.9 |
| Softening Point (° C.) | 350 | 335 | 340 | 340 | 350 | 350 | 350 |

TABLE 1-continued

| Glass Composition (% by mole) | 1 | 2 | 3 | 4 | 5 | 6 | 7 |
|---|---|---|---|---|---|---|---|
| Firing Temperature (° C.) | 350 | 340 | 345 | 345 | 350 | 355 | 355 |
| Internal Transmittance (%) | 95 | 97 | 96 | 98 | 98 | 95 | 97 |
| Reaction Between Glass and Phosphor | ○ | ○ | ○ | ○ | ○ | ○ | ○ |
| Light-Emitting Efficiency (lm/W) <Before Weather Resistance Test> | 19 | 20 | 19 | 20 | 19 | 21 | 19 |
| Light-Emitting Efficiency (lm/W) <After Weather Resistance Test> | 19 | 20 | 19 | 20 | 19 | 21 | 19 |
| Surface State <After Weather Resistance Test> | ◎ | ◎ | ◎ | ◎ | ◎ | ◎ | ◎ |

TABLE 2

| Glass Composition (% by mole) | 8 | 9 | 10 | 11 | 12 | 13 | 14 |
|---|---|---|---|---|---|---|---|
| SnO | 62.0 | 62.0 | 69.5 | 66.0 | 66.0 | 42.0 | 71.0 |
| $P_2O_5$ | 21.0 | 21.0 | 24.0 | 22.5 | 22.5 | 40.0 | 5.0 |
| $B_2O_3$ | 11.5 | 14.5 | 1.0 | 3.0 | 4.0 | 13.0 | 20.0 |
| $Al_2O_3$ | 2.5 | 2.5 | 3.0 | 5.0 | 4.0 | 3.0 | — |
| $SiO_2$ | — | — | 2.5 | 1.0 | 2.0 | — | — |
| $Li_2O$ | — | — | — | — | — | — | — |
| $Na_2O$ | — | — | — | 2.5 | 1.5 | — | — |
| $K_2O$ | — | — | — | — | — | — | — |
| MgO | — | — | — | — | — | — | 1.0 |
| CaO | — | — | — | — | — | — | 3.0 |
| SrO | — | — | — | — | — | — | — |
| BaO | 3.0 | — | — | — | — | 2.0 | — |
| ZnO | — | — | — | — | — | — | — |
| NiO | — | — | — | — | — | — | — |
| $SnO/P_2O_5$ | 2.9 | 2.9 | 2.9 | 2.9 | 2.9 | 1.1 | 14.0 |
| Softening Point (° C.) | 360 | 345 | 330 | 320 | 325 | 400 | 330 |
| Firing Temperature (° C.) | 365 | 345 | 330 | 330 | 330 | 400 | 330 |
| Internal Transmittance (%) | 96 | 97 | 98 | 96 | 98 | 97 | 87 |
| Reaction Between Glass and Phosphor | ○ | ○ | ○ | ○ | ○ | ○ | ○ |
| Light-Emitting Efficiency (lm/W) <Before Weather Resistance Test> | 18 | 19 | 7 | 12 | 15 | 13 | 14 |
| Light-Emitting Efficiency (lm/W) <After Weather Resistance Test> | 18 | 19 | 4 | 10 | 15 | 8 | 14 |
| Surface State <After Weather Resistance Test> | ◎ | ◎ | ○ | ○ | ◎ | ○ | ◎ |

TABLE 3

| Glass Composition (% by mole) | 15 | 16 | 17 | 18 | 19 | 20 | 21 |
|---|---|---|---|---|---|---|---|
| SnO | 55.0 | 64.0 | 48.0 | 36.0 | 50.0 | 34.0 | 62.0 |
| $P_2O_5$ | 15.0 | 4.0 | 24.0 | 18.0 | 11.0 | 41.0 | 21.0 |
| $B_2O_3$ | 19.0 | 29.0 | 22.0 | 20.0 | 19.0 | 17.0 | 11.5 |
| $Al_2O_3$ | 2.0 | 2.5 | 3.0 | 5.0 | 5.0 | 3.0 | 2.5 |
| $SiO_2$ | 3.0 | — | — | 6.0 | 6.0 | — | — |
| $Li_2O$ | 1.5 | — | — | 3.0 | — | — | — |
| $Na_2O$ | 1.5 | — | — | — | — | — | — |
| $K_2O$ | — | — | — | 4.0 | 1.0 | — | — |
| MgO | — | — | 3.0 | 3.0 | 4.0 | 3.0 | 3.0 |
| CaO | 3.0 | 0.5 | — | 3.0 | 3.0 | 2.0 | — |
| SrO | — | — | — | — | — | — | — |
| BaO | — | — | — | — | — | — | — |
| ZnO | — | — | — | 2.0 | 1.0 | — | — |
| NiO | — | — | — | — | — | — | 0.005 |
| $SnO/P_2O_5$ | 3.7 | 16.0 | 2.0 | 2.0 | 4.5 | 0.8 | 2.9 |
| Softening Point (° C.) | 365 | 350 | 360 | 380 | 360 | 410 | 350 |
| Firing Temperature (° C.) | 365 | 350 | 360 | 380 | 360 | 410 | 350 |
| Internal Transmittance (%) | 98 | 89 | 98 | 98 | 98 | 98 | 94 |
| Reaction Between Glass and Phosphor | ○ | ○ | ○ | ○ | ○ | ○ | ○ |
| Light-Emitting Efficiency (lm/W) <Before Weather Resistance Test> | 18 | 15 | 18 | 17 | 17 | 10 | 16 |
| Light-Emitting Efficiency (lm/W) <After Weather Resistance Test> | 18 | 15 | 18 | 17 | 17 | 8 | 16 |
| Surface State <After Weather Resistance Test> | ◎ | ◎ | ◎ | ◎ | ◎ | ○ | ◎ |

TABLE 4

| Glass Composition (% by mole) | 22 | 23 | 24 | 25 | 26 |
|---|---|---|---|---|---|
| SnO | 62.0 | 62.0 | 62.0 | 62.0 | — |
| $P_2O_5$ | 21.0 | 21.0 | 21.0 | 21.0 | — |
| $B_2O_3$ | 11.5 | 11.5 | 11.5 | — | 45.0 |
| $Al_2O_3$ | 2.5 | 2.5 | 2.5 | 3.0 | 5.0 |
| $SiO_2$ | — | — | — | — | 5.0 |
| $Li_2O$ | — | — | — | — | 5.0 |
| $Na_2O$ | — | — | — | — | 5.0 |
| $K_2O$ | — | — | — | — | — |
| MgO | 3.0 | 3.0 | 3.0 | — | — |
| CaO | — | — | — | — | — |
| SrO | — | — | — | — | — |
| BaO | — | — | — | — | — |
| ZnO | — | — | — | 14.0 | 35.0 |
| NiO | 0.01 | 0.02 | 0.03 | — | — |
| $SnO/P_2O_5$ | 2.9 | 2.9 | 2.9 | 2.9 | — |
| Softening Point (° C.) | 350 | 350 | 350 | 340 | 570 |
| Firing Temperature (° C.) | 350 | 350 | 350 | 340 | 570 |
| Internal Transmittance (%) | 90 | 82 | 73 | 90 | 95 |
| Reaction Between Glass and Phosphor | ○ | ○ | ○ | X | X |
| Light-Emitting Efficiency (lm/W) <Before Weather Resistance Test> | 14 | 10 | 6 | 3 | <0.1 |
| Light-Emitting Efficiency (lm/W) <After Weather Resistance Test> | 14 | 10 | 6 | 1 | — |
| Surface State <After Weather Resistance Test> | ◎ | ◎ | ◎ | X | — |

Each sample in the tables was prepared as follows.

First, ingredients were blended with each other to give a glass composition in the tables, and mixed into a uniform state. Next, the blended ingredients were put into an aluminum crucible, and then melted in a $N_2$ atmosphere at 900° C. for 2 hours (or melted therein at 1200° C. for 2 hours only about No. 26). Thereafter, a part of the glass melt was cast onto a carbon plate so as to be formed into a plate form, and the rest was molded into a film form by use of a roller molding device. Subsequently, the resultant film-form glass was crushed by means of a crusher, and then the resultant was passed through a 325-mesh sieve to yield a classified glass powder. The resultant plate-form glass was annealed, cut and polished, then the internal transmittance of the glass was measured, and the softening point of the glass powder was measured. These measured results are shown in the table.

Next, to 99% by mass of the resultant glass powder was added 1% by mass of $SrBaSiO_4:Eu^{2+}$ powders (a phosphor having a heat resistance of about 500° C.), and the powders were mixed with each other to yield a phosphor composite material. Next, the resultant phosphor composite material was put into a mold, and then press-molded to form a preliminary molded body having a size of 15 mm×15 mm and having a thickness of 5 mm. This preliminary molded body was fired at a firing temperature shown in the Table under a reduced pressure of 100 Pa (1 atm.=$1.013 \times 10^5$ Pa), and then processed to yield a phosphor composite member having a size of 10 mm×10 mm and having a thickness of 1 mm. With the resultant phosphor composite member, the reaction between the glass and the phosphor, the light-emitting efficiency, and the weather resistance were evaluated, and the results are shown in the table.

As illustrated in the tables, in each of the samples Nos. 1-19 and Nos. 21-23 in Examples, the softening point of the glass was as low as 400° C. or lower, so that the sample was able to be fired at a temperature of 400° C. or lower. Moreover, the internal transmittance of the glass was as high as 82%, and, in the evaluation of the reaction between the glass and the phosphor, the sintered body was not colored, and the light-emitting efficiency was as high as 7 lm/W or more. Furthermore, the light-emitting efficiency after the weather resistance test was 4 lm/W or more, and the decrease ratio of the light-emitting efficiency due to the weather resistance test (1—(the light-emitting efficiency before the test)/(the light-emitting efficiency after the test)) was also as low as 43%. In the sintered body surface after the test, no cloudiness was observed with the naked eye, and the sample was excellent in weather resistance. With the sample No. 20, the internal transmittance of the glass was 98%, but the softening point of the glass was as high as 410° C.; thus, the light-emitting efficiency thereof was lower than those in other Examples, wherein $B_2O_3$ was incorporated to the same degree in order to restrain the reaction with the phosphor. With the sample No. 24, regarding the evaluation of the reaction between the glass and the phosphor, the sintered body was not colored so that the glass and the phosphor were not easily caused to react with each other; however, the internal transmittance of the glass was as low as 73%, so that the light-emitting efficiency was lower than those in other Examples.

On the contrary, with the sample No. 25 in Comparative Example, the glass and the phosphor were caused to react with each other upon firing, so that the sintered body was colored, and the light-emitting efficiency was as low as lm/W. The light-emitting efficiency after the weather resistance test was 1 lm/W, the decrease ratio of the light-emitting efficiency through the weather resistance test was as large as 67%, and further the sintered body surface after the test was cloudy according to an observation with the naked eye. According to an observation with a microscope, fine cracks and elution of the glass components were recognized, and the weather resistance was low. Moreover, the glass softening point of the sample No. 26 was as high as 570° C., so that the firing temperature also was high, the phosphor was deteriorated in the firing so that the light-emitting efficiency was remarkably low.

The softening point of the glass powders was measured with a macro type differential thermal analyzer, and the value of a fourth inflection point was defined as the softening point.

The internal transmittance of the glasses was obtained by subjecting the glass formed into a plate form to optical polishing processing so as to have a thickness of 1 mm, measuring the transmittance and reflectivity thereof at a wavelength of 588 nm with a spectrophotometer, and then obtaining the internal transmittance (the value obtained by adding the reflectivity on both surfaces of the sample to the transmittance).

The reaction between the glass and the phosphor was evaluated by observing whether or not the sample (phosphor composite member) obtained by firing the glass and the phosphor was colored. The individual samples were observed with the naked eye, a sample having the sample color (yellow) as the color of the phosphor powder is represented by "◉", and a sample colored into a color different from that of the phosphor powder is represented by "x". The expression that a sample is colored into a color different from that of the phosphor powder means that the glass and the phosphor are caused to react with each other by heat upon firing and the phosphor is deteriorated.

The light-emitting efficiency was obtained by setting the sample onto a blue LED (wavelength: 465 nm) operated at a current of 20 mA, measuring the energy distribution spectrum of lights emitted from the upper surface of the sample in an integrating sphere, multiplying the resultant spectrum by the relative luminosity to calculate the total luminous flux, and then dividing the resultant total luminous flux by the electric power (0.072 W) of the light source.

The weather resistance was evaluated by allowing the phosphor composite member to stand still under conditions 2 atmospheres in pressure, 95% in humidity and at a temperature of 121° C. in a pressure cooker test machine for 24 hours, and then observing the light-emitting efficiency of the sample after the test and whether or not the surface thereof became cloudy. The light-emitting efficiency after the test was obtained as described above. About the presence or absence of cloudiness on the individual sample surfaces after the test, the sample surfaces were observed with the naked eye and a microscope, a sample where cloudiness due to fine cracks or the elution of the glass components or the like was not found with the naked eye and the microscope is represented by "⊙", a sample where cloudiness was not found with the naked eye but was found with the microscope is represented by "○", and a sample where cloudiness was found with the naked eye and the microscope is represented by "x".

INDUSTRIAL APPLICABILITY

The phosphor composite material and the phosphor composite member of the present invention are not limited to use for an LED, and may be used for products which emit high-power excited light, such as a laser diode.

The invention claimed is:

1. A phosphor composite material comprising a glass powder and a phosphor powder, wherein the glass powder is a $SnO$—$P_2O_5$—$B_2O_3$ glass containing $B_2O_3$ in an amount of 2 to 30% by mole and $P_2O_5$ in an amount of 5 to 24% by mole.

2. The phosphor composite material according to claim 1, wherein in the $SnO$—$P_2O_5$—$B_2O_3$ glass, the ratio of $SnO/P_2O_5$ is from 0.9 to 16 in a mole ratio.

3. The phosphor composite material according to claim 1, wherein the $SnO$—$P_2O_5$—$B_2O_3$ glass, in a mole percentage, has the following composition: 35 to 80% of $SnO$, 5 to 24% of $P_2O_5$, 2 to 30% of $B_2O_3$, 0 to 10% of $Al_2O_3$, 0 to 10% of $SiO_2$, 0 to 10% of $Li_2O$, 0 to 10% of $Na_2O$, 0 to 10% of $K_2O$, 0 to 10% of $Li_2O+Na_2O+K_2O$, 0 to 10% of $MgO$, 0 to 10% of $CaO$, 0 to 10% of $SrO$, 0 to 10% of $BaO$ and 0 to 10% of $MgO+CaO+SrO+BaO$, and satisfies the following: the ratio of $SnO/P_2O_5$ is from 0.9 to 16.

4. The phosphor composite material according to claim 1, wherein the $SnO$—$P_2O_5$—$B_2O_3$ glass has a softening point of 400° C. or lower.

5. The phosphor composite material according to claim 1, wherein the blend ratio by mass of the glass powder to the phosphor powder (the glass powder:the phosphor powder) is from 99.99:0.01 to 70:30.

6. A phosphor composite member obtained by firing the phosphor composite material according to claim 1.

7. The phosphor composite member according to claim 6, converting light rays having a wavelength of 300 to 500 nm to visible rays.

\* \* \* \* \*